UNITED STATES PATENT OFFICE.

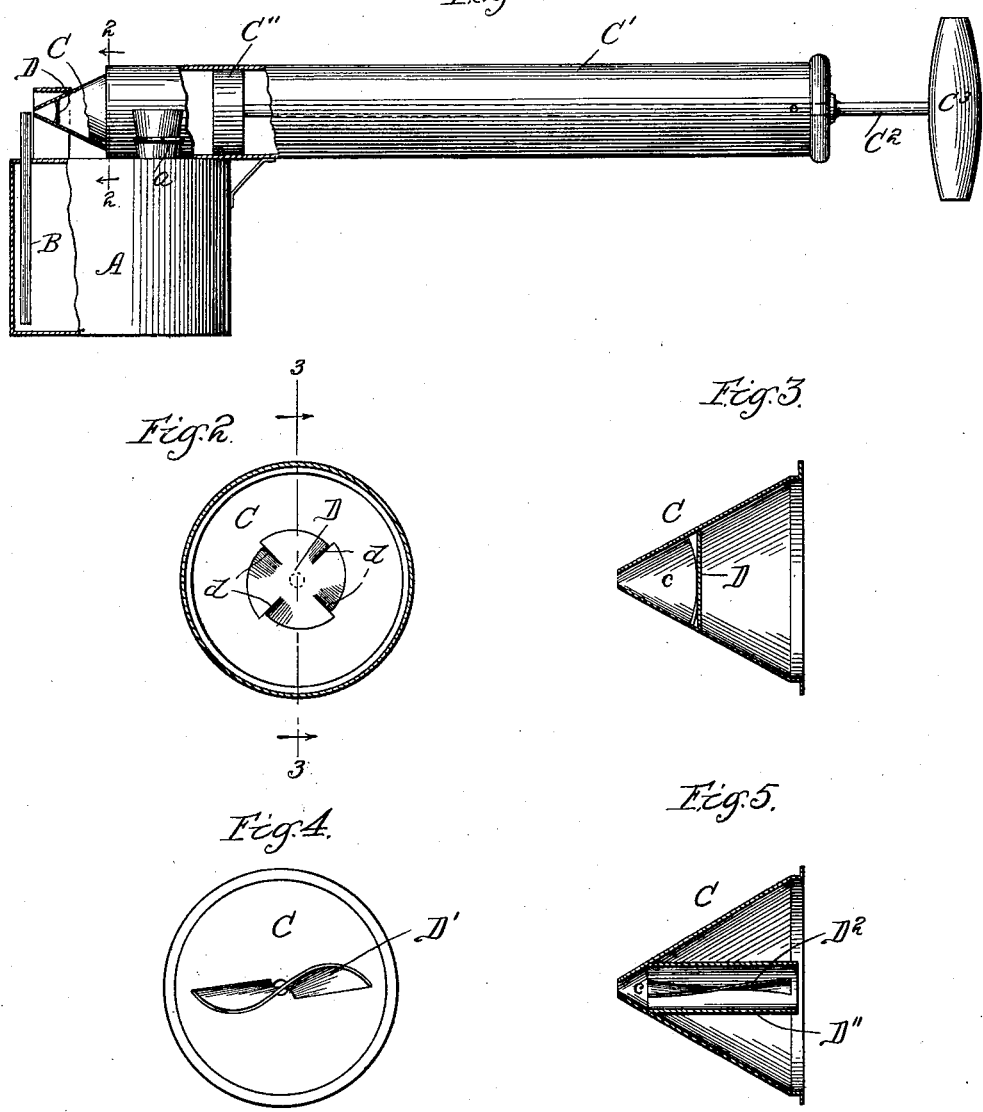

ROLAND MORRILL, OF BENTON HARBOR, MICHIGAN, ASSIGNOR OF ONE-HALF TO FERNANDO MORLEY, OF SAME PLACE.

ATOMIZER.

SPECIFICATION forming part of Letters Patent No. 628,251, dated July 4, 1899.

Application filed November 17, 1898. Serial No. 696,701. (No model.)

*To all whom it may concern:*

Be it known that I, ROLAND MORRILL, a citizen of the United States, residing at Benton Harbor, in the county of Berrien and State of Michigan, have invented certain new and useful Improvements in Atomizers, of which the following is a specification.

The object of the present invention is to provide an atomizer with means for diffusing or distributing the spray over as great an area as possible, with a view to lessening the labor involved in spraying extensive surfaces and economizing in respect to the quantity of liquid used therefor.
Atomizers are extensively used for distributing poison over foliage for the purpose of killing insects and the like, and in an atomizer used for this purpose it is highly desirable that at each operation of the plunger the poison be distributed over as large an area as possible. It has been attempted to use for this purpose various devices, all of which are so disposed that the spray after being formed comes in contact with them; but it has been found that it is impracticable to diffuse the spray by the use of any device which is so disposed that the spray comes in contact with it after being formed. I have discovered that the object above stated may be accomplished by giving the air a rotary or swirling or vortical motion before it leaves its discharge-nozzle and before it reaches the liquid-tube. I am aware that nozzles for spraying liquids have been provided with means for imparting a like motion to the liquid before it leaves the nozzle; but I am not aware that the idea of imparting such motion to the air in an atomizer has ever been suggested, and I therefore desire to have it understood that in its broadest aspect my present invention is not limited to the details in the construction or character of the means employed for imparting this motion to the air. On the contrary, the invention, broadly stated, consists in an atomizer having a liquid-tube, an air-discharge nozzle, and means for imparting to the air a rotary or swirling or vortical movement before it leaves its nozzle to the end that after leaving the nozzle it will take up the atoms of the liquid to be atomized and by centrifugal force cause them to be discharged over a large area.

The invention is designed more especially for embodiment in atomizers used for the purpose above described; but it is not limited thereto and may be embodied in atomizers for other purposes where it is desirable to distribute a spray over a large area.

In the accompanying drawings, which are made a part of this specification, Figure 1 is a view, partly in elevation and partly in section, of an atomizer embodying the invention and designed and intended more especially for distributing poison over foliage. Fig. 2 is an enlarged section of the air-nozzle thereof on the line 2 2 of Fig. 1 looking in the direction of the arrow. Fig. 3 is an axial section of said nozzle on the line 3 3 of Fig. 2. Figs. 4 and 5 are, respectively, a transverse and longitudinal section of modifications embodying the principal feature of the invention.

A represents a reservoir having a filling-orifice closed by a stopper $a$, and B is the liquid-tube, which passes through the top of the reservoir, terminating at its lower end near the bottom of the reservoir and at its upper end in the immediate vicinity of the discharge-orifice of the nozzle C or the air-pump C'.

The present invention is in no way concerned with or limited to the character of the device for causing a current of air to be forcibly discharged from the air-nozzle C, and hence the means shown in the drawings for accomplishing this purpose must be taken as being simply illustrative of what may be used, with the understanding, however, that any other suitable means may be substituted therefor without departing from the spirit of the invention. The means shown in the drawings consist simply of a cylinder C', in which fits a piston C'', carried by a rod $C^2$, provided with a handle $C^3$. This is an air-pump of simple construction.

The invention resides in the means for imparting the described rotary or swirling or vortical motion to the air before it leaves the nozzle C, and within the scope of the invention any means that will accomplish this result may be used. The means I prefer is shown in Figs. 1, 2, and 3, and consists of a disk D, provided with one or more radial slits d, extending inward a suitable distance from its periphery, the margin of the metal on one side of each of the slits being deflected out of the general plane of the disk and toward the discharge-orifice. The object of this is to provide a deflector which diverts the air from a course strictly in line with the movement of the piston and causes it in passing the deflector to take the described swirling motion. As will be seen upon reference to the drawings, the deflector is located a short distance back from the discharge-orifice, and the object of this is to provide beyond the deflector an uninterrupted space or chamber c, in which the air can freely circulate to the end that it may attain the greatest possible rotary velocity before leaving the nozzle. While I prefer to use this means, still the invention is not limited thereto, and in Figs. 4 and 5 I have shown other means by which the same result can be accomplished in kind if not in degree. In Fig. 4 I have shown a spiral partition D' disposed longitudinally in the nozzle and terminating some distance in rear of the discharge-orifice. In Fig. 5 I have shown a tube D'' disposed within the discharge-nozzle and a spiral partition $D^2$ disposed longitudinally within the tube D'' and terminating some distance in rear of the discharge-orifice. With any of these devices the air issuing from the discharge-orifice has the described rotary or swirling or vortical motion and while so moving passes the end of the liquid-tube B and draws from the reservoir the liquid to be atomized. As before stated, by reason of the described motion of the air the atoms of liquid are thrown off by centrifugal force, and in this way the spray is distributed over a large area.

Having thus described my invention, the following is what I claim as new therein and desire to secure by Letters Patent:

1. In an atomizer the combination with a liquid-reservoir, a liquid-tube, an air-nozzle having its discharge-orifice disposed in proximity to the orifice of the liquid-tube and means for discharging air through said nozzle, of means for imparting to the air, before it leaves the nozzle, a rotary, or swirling, or vortical motion, substantially as set forth.

2. In an atomizer the combination with a liquid-reservoir, a liquid-tube, an air-nozzle having its orifice disposed in proximity to the orifice of the liquid-tube, and means for discharging air through said nozzle, of means disposed within the nozzle for imparting to the air, before it leaves the nozzle, a rotary, or swirling, or vortical movement, substantially as set forth.

3. In an atomizer the combination with a liquid-reservoir, a liquid-tube, an air-nozzle, and means for discharging air through said nozzle, of a device disposed within the nozzle for imparting to the air, as it passes through the nozzle, a rotary, or swirling, or vortical movement, said device being disposed some distance in rear of the discharge-orifice so as to leave between it and said orifice an uninterrupted space, substantially as and for the purpose described.

4. In an atomizer, the combination with a liquid-reservoir, a liquid-tube, an air-nozzle having its orifice disposed in proximity to the orifice of the liquid-tube and means for discharging air through said nozzle, of a disk disposed in the nozzle and having means for imparting to the air as it passes it the described swirling movement, substantially as set forth.

5. In an atomizer the combination with a liquid-reservoir, a liquid-tube, an air-nozzle having its discharge-orifice disposed in proximity to the orifice of the liquid-tube, and means for discharging air through said nozzle, of a disk disposed in the nozzle, some distance in rear of the discharge-orifice, said disk having a radial slit and having a portion thereof adjacent to the slit deflected to form a passage for the air, substantially as set forth.

ROLAND MORRILL.

Witnesses:
G. M. VALENTINE,
FREMONT EVANS.